(12) United States Patent
Lofthouse et al.

(10) Patent No.: US 12,025,267 B1
(45) Date of Patent: Jul. 2, 2024

(54) BORE LUBRICATION SYSTEM

(71) Applicant: Dana Automotive Systems Group, LLC, Maumee, OH (US)

(72) Inventors: Casey R. Lofthouse, Lima, OH (US); Scott L Steward, Jr., Malinta, OH (US); Brandon Ware, Toledo, OH (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 0 days.

(21) Appl. No.: 18/155,566

(22) Filed: Jan. 17, 2023

(51) Int. Cl.
  F16N 3/08 (2006.01)
  F16N 3/00 (2006.01)
  F16N 25/00 (2006.01)

(52) U.S. Cl.
  CPC ............... F16N 3/00 (2013.01); *F16N 25/00* (2013.01)

(58) Field of Classification Search
  CPC ... F16N 3/00; F16N 25/00; F16N 7/00; B05C 7/00; B05C 17/00
  See application file for complete search history.

(56) References Cited

U.S. PATENT DOCUMENTS

| | | | | |
|---|---|---|---|---|
| 1,055,540 A | * | 3/1913 | Kelsey | F16N 7/30 184/26 |
| 4,499,968 A | * | 2/1985 | Zimmerly | F16N 7/14 184/29 |
| 5,520,737 A | * | 5/1996 | Denton | B05C 3/09 118/400 |
| 5,639,191 A | * | 6/1997 | Womack | B23G 1/16 470/181 |
| 10,041,626 B2 | * | 8/2018 | Dann | F16N 3/00 |
| 11,247,837 B1 | * | 2/2022 | May | B65D 35/28 |
| 2015/0377412 A1 | * | 12/2015 | Dann | F16N 7/12 184/28 |
| 2017/0247989 A1 | * | 8/2017 | Casey | F04B 9/1273 |

FOREIGN PATENT DOCUMENTS

WO  WO-9962644 A1 * 12/1999 ............... B05C 7/00

* cited by examiner

*Primary Examiner* — Michael A Riegelman
(74) *Attorney, Agent, or Firm* — McCoy Russell LLP

(57) ABSTRACT

Methods and systems are shown lubricating a cylindrical bore. In one example, a lubrication system comprises a piston-shaped bore lubricator with a plunger portion including a soft, porous material arranged in an external groove at a distal end of the plunger portion, the groove including holes through which a lubricant is ejected into the soft, porous material as the plunger portion is positioned in a bore. A proximal end of the piston-shaped plunger includes threads for coupling a squeezable lubricant source bottle, where the lubricant is ejected through the felt via an actuation of the squeezable bottle, or by gravity, or via a different kind of dispenser. An outside diameter of the piston may be adjusted to fit an interior diameter of the bore, and a size of the holes may be adjusted to increase or decrease a flow rate of the lubricant.

19 Claims, 6 Drawing Sheets

BORE LUBRICATION SYSTEM

TECHNICAL FIELD

The present disclosure relates to a lubrication system for lubricating bores.

BACKGROUND AND SUMMARY

A manufacturing plant may manufacture equipment or machinery including a machined bore, such as a cylindrical bore. A machined interior surface of the bore may be lubricated, where a lubricant may be applied to the machined interior surface. For example, the lubricant may be applied prior to installing an O-ring within the bore, to help protect the O-ring from potential damage. However, conventional methods for applying the lubricant to the machined interior surface may not apply the lubricant in an even, uniform manner, where some portions of the interior surface may be over-lubricated, while other portions may be under-lubricated. For example, painting the interior surface with lubricant may result in a non-uniform application, and may result in false-positives for leaks in some applications. Applying lubricant to the O-ring may generate inconsistent results, and cause operator contact with lubrication, which is undesirable.

Various lubricant applicators have been proposed to address this issue. For example, U.S. Pat. No. 4,499,968 A to Zimmerly teaches a bore lubricating device in which a plunger is inserted into a bore and lubricant is injected through the plunger to coat the inside of the bore. However, Zimmerly's bore lubricating device may not uniformly coat the bore, and may provide inconsistent results with bores of different diameters.

To address drawbacks in Zimmerly's and other current bore lubrication systems, the inventors herein have developed a bore lubrication system to at least partially overcome the challenges described. In one example, a lubrication system comprises a piston-shaped bore lubricator with a plunger portion including a soft, porous material arranged in an external groove at a distal end of the plunger portion, the groove including holes through which a lubricant is ejected into the soft, porous material as the plunger is positioned in a bore. A proximal end of the bore lubricator includes threads for coupling a lubricant delivery system, where the lubricant is ejected through the soft, porous material via an actuation of the lubricant delivery system. An outside diameter of the piston may be adjusted to fit an interior diameter of the bore, and a size of the holes may be adjusted to increase or decrease a flow rate of the lubricant. By delivering the lubricant through the soft, porous material, the lubrication system uniformly coats the bore prior to O-ring installation, increasing an efficiency of assembly and protecting the O-ring from potential damage.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Various aspects of this disclosure may be better understood upon reading the following detailed description and upon reference to the drawings, in which.

DETAILED DESCRIPTION

Figure 1:
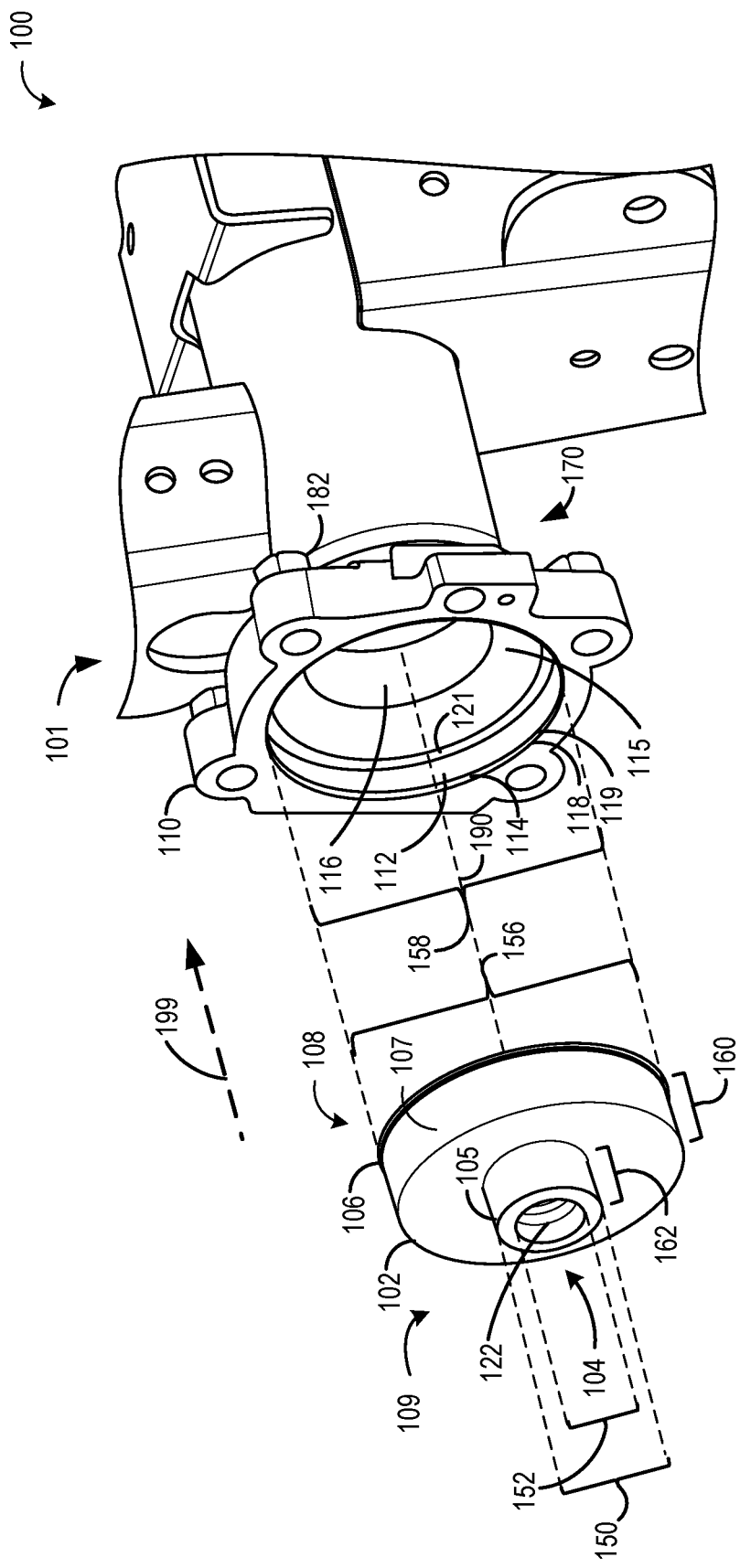
FIG. 1 is a schematic drawing of a bore and bore lubricator.
Figure 2A:
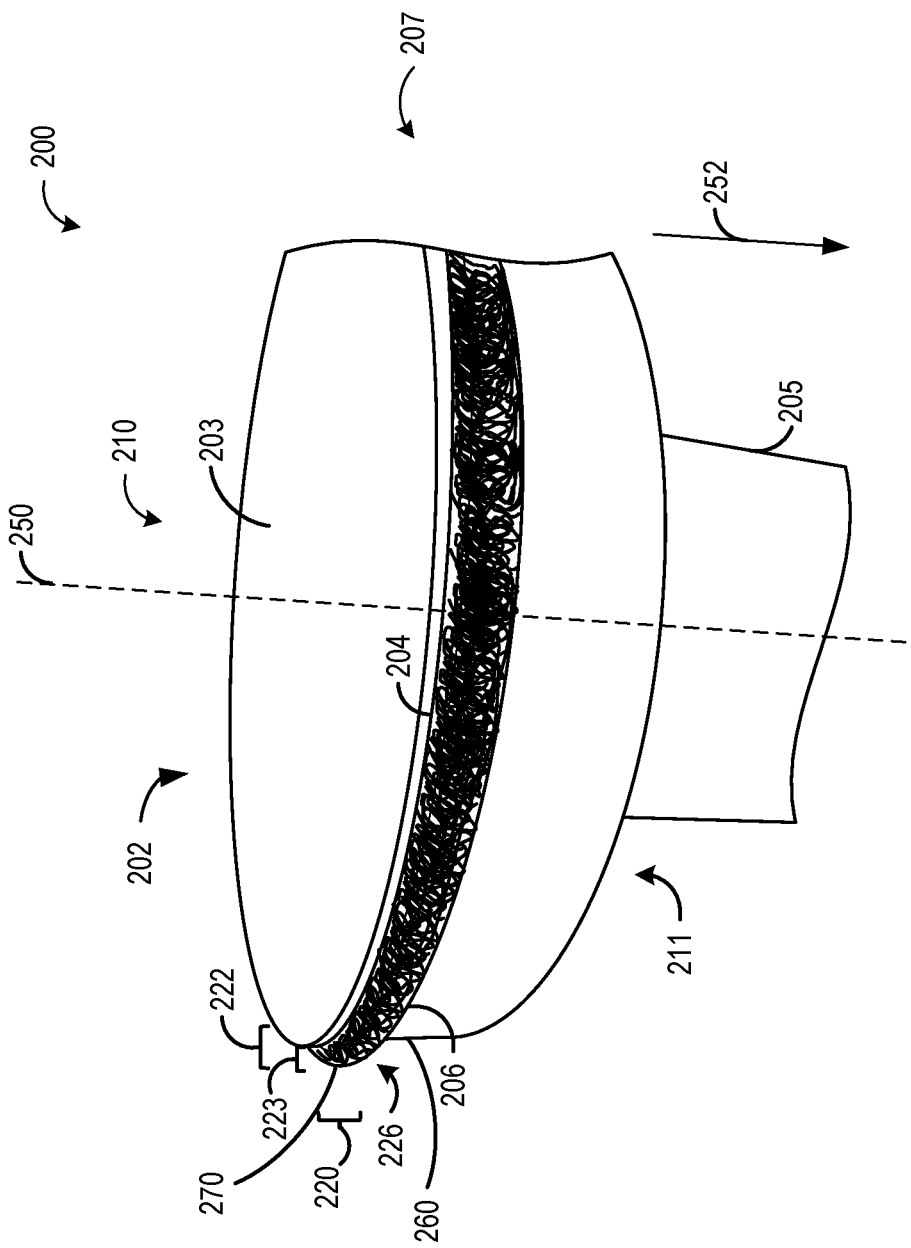
FIG. 2A is a perspective view of the bore lubricator of FIG. 1.
Figure 2B:
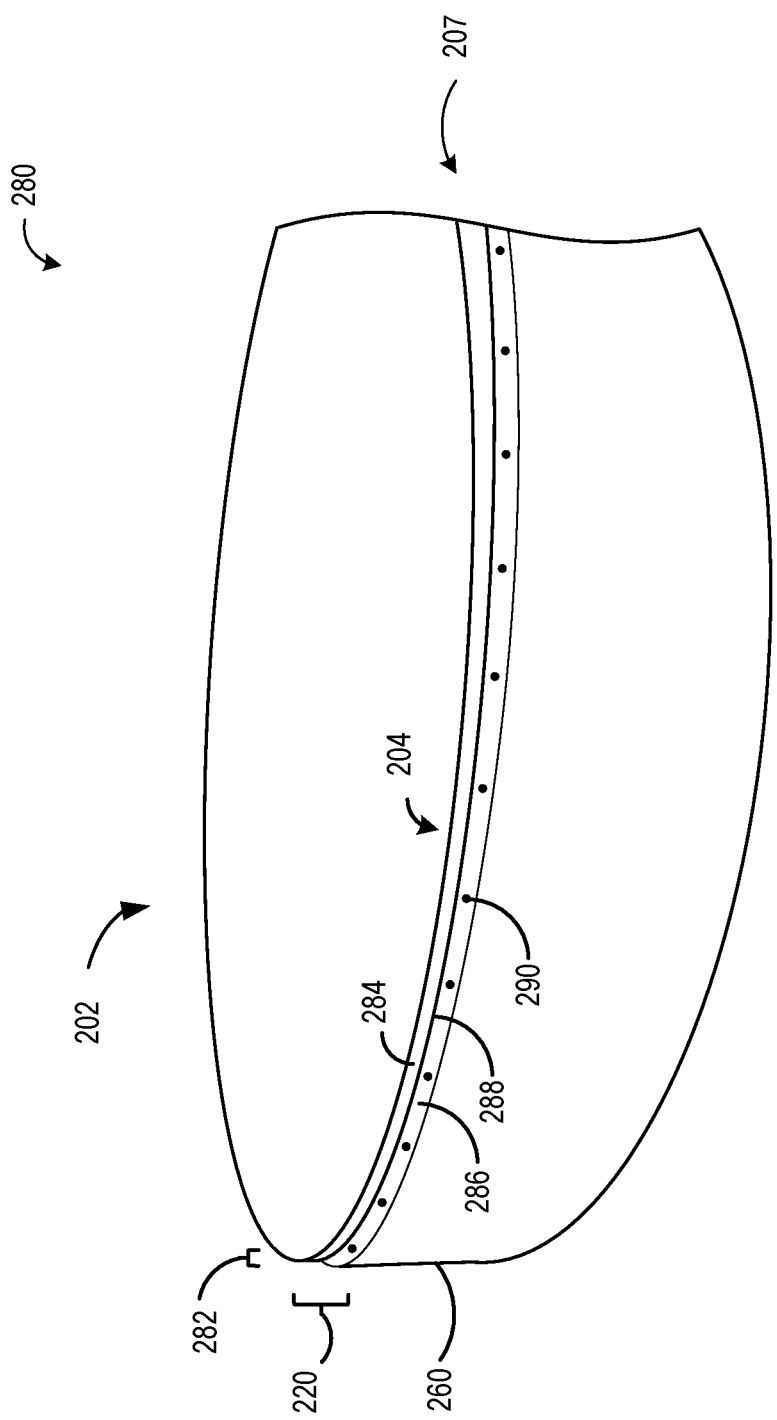
FIG. 2B is a perspective view of the bore lubricator of FIG. 1 with a lubricant applicator removed.

A bore lubricator is described herein that efficiently lubricates a bore. An exemplary bore lubricator and a corresponding bore is shown in FIG. 1. The bore lubricator may have a plunger portion with a cylindrical shape including a lubricant applicator that extends out from an outer wall along a circumference of the plunger portion, as shown in FIG. 2A. The bore lubricator may have a piston portion, which may include a handle into which a squeezable bottle of lubricant may be inserted, as shown in FIG. 5. The lubricant applicator may be placed in a groove on the outer wall including holes through which the lubricant may be ejected, as shown in FIG. 2B. The bore lubricator may be inserted into the bore to lubricate the bore, as shown pictorially in FIGS. 3A and 3B, in accordance with the method of FIG. 4.

FIG. 1 depicts an axle assembly system 100, including an axle assembly 101 and a bore lubrication system 102, also referred to herein as a bore lubricator 102, which may be used to lubricate a bore of axle assembly 101. Axle assembly 101 includes a tube flange 110 (also referred to as flange 110), which may be coupled to a portion 170 of axle assembly 101 including a bore hole 116. Flange 110 may be coaxially aligned with bore hole 116, around a central axis 190 of bore hole 116. In the depicted embodiment, flange 110 is bolted to portion 170 of axle assembly 101 via a plurality of bolts 182.

Flange 110 includes a flange bore 112, also coaxially aligned with bore hole 116. Flange bore 112 has an inner diameter 158. In various embodiments, inner diameter 158 may be greater than a diameter of bore hole 116, and flange 110 may include a first chamfer 114, where a diameter of an inner edge 119 of first chamfer 114 is equal to inner diameter 158, and a diameter of an outer edge 118 of first chamfer 114 is greater than inner diameter 158 by a slight margin (e.g., 0.5 mm to 1 mm). Flange 110 may include a second chamfer 115, which may not be lubricated by lubricator 102. During an assembly of axle assembly 101, an O-ring may be positioned within flange bore 112, for example, at a rim 121 of flange 110 between flange bore 112 and outer edge 118 of first chamfer 114. Prior to placing the O-ring at rim 121, flange bore 112 may be lubricated to facilitate the placement of the O-ring. To lubricate flange bore 112, a lubricant may be applied to first chamfer 114 and flange bore 112 using bore lubricator 102.

To apply the lubricant, bore lubricator 102 may include a lubricant applicator 106. Lubricant applicator 106 may be made of a soft, porous material, which may soak up the lubricant and apply the lubricant to an inner surface of flange bore 112 upon insertion into flange bore 112. In various embodiments, the soft porous material may be felt, or a different organic or synthetic material with characteristics similar to felt. Lubricant applicator 106 may be located and/or positioned within an external groove of bore lubricator 102, as described in greater detail below in reference to FIGS. 2A and 2B. The soft, porous material may be specific to a type of application of bore lubricator 102 (e.g., a type of lubricant, a type of bore, etc.).

To apply the lubricant using lubricant applicator 106, bore lubricator 102 may be inserted into flange bore 112 in a direction indicated by arrow 199. Bore lubricator 102, including lubricant applicator 106, has a diameter 156, where diameter 156 is equal to diameter 158 of flange bore 112. Thus, as bore lubricator 102 is inserted into flange bore 112, an outer circumference of lubricant applicator 106 comes into contact with the inner surface of flange bore 112. Specifically, a diameter of bore lubricator 102 not including lubricant applicator 106 may be slightly less than diameter 158, and diameter 156 may be slightly greater than diameter 158, such that as bore applicator 102 is inserted into flange bore 112, the inner surface of flange bore 112 exerts an even pressure on the soft porous material of lubricant applicator 106 on the outer circumference of lubricant applicator 106.

Bore lubricator 102 may be have a shape similar to a piston, with a first, plunger portion 107 at a distal end 108 of bore lubricator 102, and a second, piston portion 105 at a proximal end 109 of bore lubricator 102, with respect to an operator of bore lubricator 102. In FIG. 1 and other figures included herein, plunger portion 107 and piston portion 105 are depicted and described as having cylindrical shapes, where plunger portion 107 may lubricate a round bore hole. However, it should be appreciated that in other embodiments, either or both of plunger portion 107 and piston portion 105 may not have a cylindrical shape. For example, plunger portion 107 may be cylindrical and piston portion 105 may have a three-dimensional rectangular shape; or plunger portion 107 and piston portion 105 may both have a three-dimensional rectangular shape; piston portion 105 may be cylindrical and plunger portion 107 may be a three-dimensional hexagonal or octagonal shape; or either or both of piston portion 105 and plunger portion 107 may be of a different shape.

Diameter 156 of plunger portion 107 may be greater than a diameter 150 of piston portion 105, to ensure that surfaces of piston portion 105 do not come in contact with the inner surface of flange bore 112 during lubrication. Lubricant applicator 106 may be included on plunger portion 107, and positioned at distal end 108. In other words, lubricant applicator 106 may be positioned at an end of bore lubricator 102 closest to a bore hole to be lubricated (e.g., flange bore 112). Plunger portion 107 may have a length 160, and piston portion 105 may have a length 162. Length 160 may be greater than length 162, or length 160 may be less than length 162, or length 160 may be equal to length 162, in various embodiments.

Piston portion 105 may be hollow, where piston portion 105 may include an aperture 104 coaxially aligned around central axis 190. Aperture 104 may have a diameter 152, such that piston portion 105 may have a thickness equal to the difference between diameter 150 and diameter 152. An inner surface 122 of aperture 104 may be threaded, to allow a lubricant delivery system to be inserted into aperture 104 and coupled to bore lubricator 102 by screwing a threaded portion of the lubricant delivery system into piston portion 105 via the threaded inner surface 122.

In various embodiments, the lubrication delivery system may include a lubricant bottle, which may be screwed into threaded inner surface 122. The lubricant bottle may be squeezed by a user of bore lubricator 102, to propel lubricant from the lubricant bottle through one or more conduits within piston portion 105 and plunger portion 107 to lubricant applicator 106, as described in greater detail below.

In other embodiments, a different lubrication delivery system may be used. In embodiments where length 162 of piston portion 105 is greater than a length of a threaded portion of the lubricant bottle, piston portion 105 may include a first, hollow part including aperture 104, and a second hollow part including a lubricant conduit through which the lubricant may be delivered. The lubricant conduit may connect with a plurality of conduits included in plunger portion 107 that allow the lubricant to be delivered to lubricant applicator 106, as described in greater detail in reference to FIGS. 2A and 2B.

Further, in some embodiments, piston portion 105 may include a hollow cavity into which the lubricant bottle may be inserted, including a handle which may be easily gripped by an operator. Turning briefly to FIG. 5, an embodiment of a bore lubricator 500 is shown, where bore lubricator 500 includes a plunger portion 502 and a piston portion 504. Plunger portion 502 and a piston portion 504 may be non-limiting examples of plunger portion 107 and piston portion 105 of FIG. 1. As described above in reference to FIG. 1, bore lubricator 500 includes a threaded inner surface 510 (e.g., threaded inner surface 122) where a lubricant bottle may be screwed into bore lubricator 500. The lubricant bottle may be inserted into a hollow cavity 508 of bore lubricator 500. When the lubricant bottle is inserted into hollow cavity 508, a user of bore lubricator 500 may manipulate bore lubricator 500 (for example, when inserting bore lubricator 500 into a bore hole for applying lubricant) manually by gripping an outer surface 506 of piston portion 504. In other words, piston portion 504 may serve as a handle of bore lubricator 500. Outer surface 506 may include one or more grippable features 512 along an outer circumference of outer surface 506, such as, for example, raised or contoured portions, textures, ribs, etc., which may make outer surface 506 easier to hold and bore lubricator 500 easier to manipulate. In some embodiments, piston portion 504 and/or outer surface 506 may be manufactured out of plastic, rubber, or similar material. In some embodiments, piston portion 504 and outer surface 506 may be flexible, where the user may squeeze piston portion 504 to apply lubricant from a squeezable bottle, as described above. In other embodiments, piston portion 504 and outer surface 506 may not be flexible, and the lubricant in the lubricant bottle may be applied via a different manner, such as by a force of gravity.

FIG. 2A shows an expanded, perspective view 200 of a plunger portion 207 of a bore lubricator 202, such as plunger portion 107 of bore lubricator 102. A partial view of a piston portion 205 is shown extending out from plunger portion 207 in a direction 252 (e.g., downward in FIG. 2A), along a central axis 250 of bore lubricator 202.

Plunger portion 207 includes a surface 203 at a distal end 210 of bore lubricator 202 and plunger portion 207, with respect to a user of bore lubricator 202. In the depicted embodiment, surface 203 is a flat, smooth surface. In other embodiments, surface 203 may not be flat and or may not be smooth. For example, surface 203 may be convex or concave. Surface 203 may also include a pattern or texture. In still other embodiments, surface 203 may not extend over an entirety of distal end 210 of plunger portion 207. In one embodiment, surface 203 is ring shaped, including an aperture centered around central axis 250. For example, the aperture may allow bore lubricator 202 to be inserted into a bore including a component positioned within the bore, where a space with a width greater than a width of the ring shaped surface may exist between outer edges of the component and an inner surface of the bore.

Plunger portion 207 includes a lubricant applicator 206, which may be a non-limiting example of lubricant applicator 106 of FIG. 1. Lubricant applicator 106 is positioned within a groove 204 that extends around a circumference of an outer wall 260 of plunger portion 207, where outer wall 260 extends from distal end 210 to a proximal end 211 of plunger portion 207. In FIG. 2A, lubricant applicator 206 and groove 204 are located at distal end 210 of plunger portion 207 on outer wall 260. In other embodiments, lubricant applicator 206 and groove 204 may not be located at distal end 210. For example, groove 204 may extend around the circumference of plunger portion 207 a position close to proximal end 211, or groove 204 may extend around the circumference of plunger portion 207 at a midpoint on outer wall 260 between distal end 210 and proximal end 211, or at a different location on outer wall 260.

Referring briefly to FIG. 2B, a second perspective view 280 of bore lubricator 202 is shown, where lubricant applicator 206 has been removed, revealing groove 204. Groove 204 has a width 220 and a depth 282. In some embodiments, width 220 may be greater than depth 282, and other embodiments, width 220 may be less than depth 282. Further, groove 204 may have various shapes. In the depicted embodiment, groove 204 is V-shaped, comprising a first beveled surface 284 and a second, opposing beveled surface 286 that meets at a midline 288 of groove 204. In other embodiments, groove 204 may have a round, semicircular shape, or groove 204 may have a square or rectangular profile, with a recessed, back wall and two side walls. In still other embodiments, groove 204 may have a different shape.

Groove 204 may include a plurality of holes 290 extending from an interior of plunger portion 207 to a surface of groove 204, through which lubricant may be ejected into lubricant applicator 206. As described above in reference to FIG. 1, the lubricant may be delivered to the plurality of holes 290 from a lubricant delivery system coupled to piston portion 205 of bore lubricator 202. The lubricant may be directed to the plurality of holes 290 via a respective plurality of conduits located inside bore lubricator 202 by a pressure applied by the lubricant delivery system. For example, the lubricant delivery system may include a lubricant bottle, and a user of bore lubricator 202 may squeeze the lubricant bottle, generating pressure that may direct the lubricant to plunger portion 207 through a central conduit located inside piston portion 205. At plunger portion 207, the lubricant may be directed to the plurality of holes 290 via a respective plurality of lubricant conduits leading from the central conduit to the plurality of holes 290.

In FIG. 2B, the plurality of holes 290 are located in beveled surface 286 of groove 204. In other embodiments where groove 204 is V-shaped, the plurality of holes 290 may be located in beveled surface 284 of groove 204, or in beveled surface 284 and beveled surface 286. In embodiments where groove 204 has a different shape, the plurality of holes 290 may be located in one or more walls of groove 204. A number of holes 290, a spacing of holes 290, and a size of holes 290 may depend on an application of bore lubricator 202. In other words, a first lubrication task may involve applying a first lubricant to a first bore hole. A second lubrication task may involve applying a second lubricant to a second bore hole. For the first lubrication task, a user may select a bore lubricator 202 that has a first profile of holes 290 of a first size, spacing, and number, and for the second lubrication task, the user may select a bore lubricator 202 that has a second profile of holes 290 of a second size, spacing, and number.

For example, the first lubrication task may involve a lubricant with a high viscosity, and the second lubrication task may involve a lubricant with a low viscosity, whereby the first profile may include more holes 290 than the second profile, and/or the first profile may include holes 290 that are spaced closer together than the second profile, and/or the first profile may include holes 290 of a larger diameter than the second profile.

Alternatively, the first lubrication task may involve lubricating a bore of a first type, and the second lubrication task may involve lubricating a bore of a second type. A greater amount of lubricant may be used for the first bore type that for the second bore type. As a result, a first bore lubricator 202 with a greater number of holes, and/or holes of a greater diameter, and/or holes that are spaced closer together may be selected for the first bore type, and a second bore lubricator 202 with a lesser number of holes, and/or holes of a lesser diameter, and/or holes that are spaced further apart may be selected for the second bore type. In various embodiments, the spacing of the holes may depend on the diameter of the holes, where smaller holes may be spaced closer together than larger holes. Additionally, the spacing of the holes may depend on the material used for lubricant applicator 206. For example, the lubricant may be distributed more easily, more quickly, and/or more efficiently through an organic material than a synthetic material, or vice versa. If the material supports more efficient distribution of lubricant throughout the material, the spacing of the holes may be increased. If the material supports less efficient distribution of lubricant throughout the material, the spacing of the holes may be decreased. A size of the lubricant applicator may also be adjusted to more efficiently apply the lubricant.

Returning to FIG. 2A, groove 204 may be sized to fit lubricant applicator 206. In various embodiments, lubricant applicator 206 may be an O-ring made of soft, porous material, such as felt, or a different organic or synthetic material. The O-ring may be stretched and slid over outer wall 260 and inserted into groove 204, where lubricant applicator 206 may be maintained within groove 204 by an elasticity of the O-ring. In embodiments where plunger portion 207 is not cylindrical, the O-ring may not have a round shape (e.g., lubricant applicator 206 may have a square shape, or different shape, depending on a shape of plunger portion 207). The depicted lubricant applicator 206 has a circular profile, where a width 220 (e.g., the same width as groove 204) of lubricant applicator 206 is equal to a depth 222 of lubricant applicator 206. In other embodiments, the O-ring may have an asymmetric profile, where width 220 is not equal to depth 222. For example, depth 222 may be greater than width 220.

A depth of groove 204 (e.g., depth 282) may be less than depth 222 of lubricant applicator 206, where an extending portion 226 of lubricant applicator 206 may extend out from outer wall 260 by a distance 223. The dimensions of plunger portion 207 may be selected such that when plunger portion 207 is inserted into a bore (e.g., flange bore 112), a space between outer wall 260 and an inner surface of the bore is minimized, while still permitting plunger portion 207 to slide freely within the bore. The depth of groove 204, the dimensions of lubricant applicator 206, and the material used for lubricant applicator 106 may be selected such that when plunger portion 207 is inserted into the bore, extending portion 226 of lubricant applicator 206 is compressed (e.g., squeezed) against the inner surface of the bore, to a degree such that an outer surface 270 of lubricant applicator is in snug contact with the inner surface along an inner circumference of the bore. As extending portion 226 is compressed against the inner surface, lubricant in lubricant applicator 206 may be applied to the inner surface. As a result of extending portion 226 being in snug contact with the inner surface along the inner circumference of the bore, the lubricant may be applied to the inner surface in an even, uniform manner.

Further, a size of lubricant applicator 206 and/or dimensions of lubricant applicator 206 may depend on an application of bore lubricator 202. A larger lubricant applicator 206 may deliver more lubricant to a bore than a smaller lubricant applicator. For example, a first bore lubricator 202 with a lubricant applicator 206 of a first size may be selected for a first lubrication task using a first type of lubricant, and a second bore lubricator 202 with a lubricant applicator 206 of a second size may be selected for a second lubrication task using a second type of lubricant. As another example, a first bore lubricator 202 with a lubricant applicator 206 of a first size may be selected for a first bore hole, and a second bore lubricator 202 with a lubricant applicator 206 of a second size may be selected for a second bore hole.

Figure 3B:
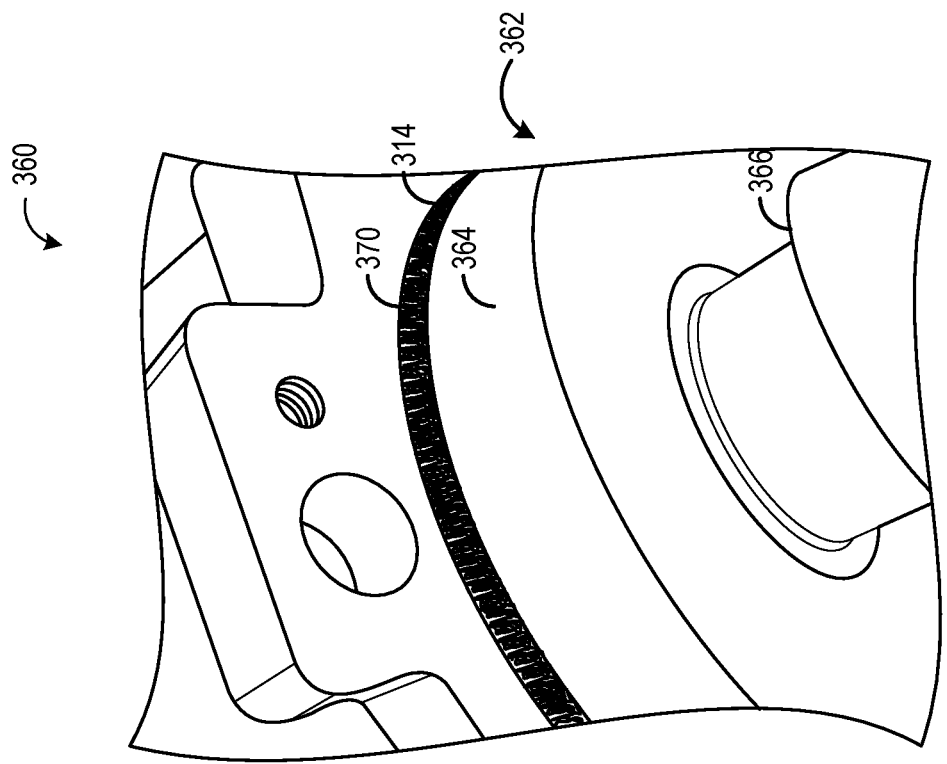
FIG. 3B is an illustration of the cylindrical bore of FIG. 3A being lubricated by the bore lubricator.
Figure 3A:
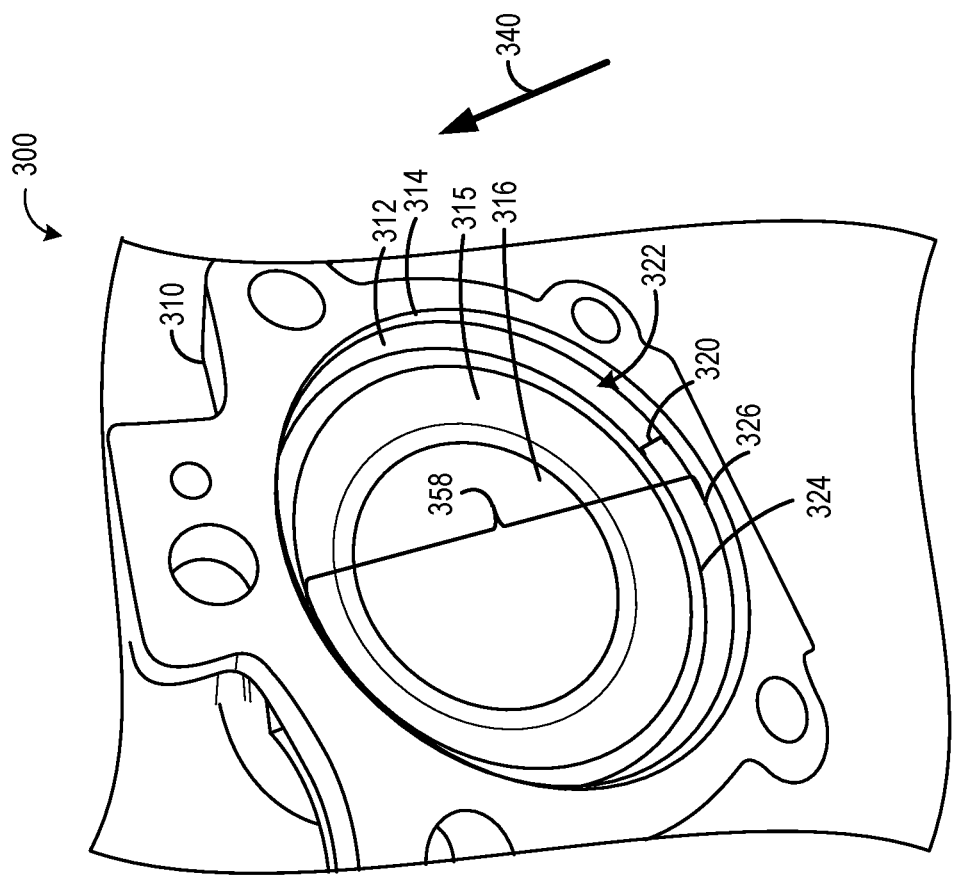
FIG. 3A is perspective view of a cylindrical bore.

FIGS. 3A and 3B illustrate a bore lubricator being used to lubricate a bore of a flange. FIG. 3A shows an exemplary axle assembly 300 including a flange 310, which may be the same as or similar to flange 110 of FIG. 1. Flange 310 includes a flange bore 312 surrounding a bore hole 316, with a first chamfer 314 (e.g., first chamfer 114) and a second chamfer 315 (e.g., second chamfer 115) on either sides of flange bore 312. Flange bore 312 has a diameter 358, and a depth 320 in a direction indicated by an arrow 340, from an inner edge 326 of first chamfer 314 to a beveled lip 324 of chamfer 314 (rim 121). A circumferential area along an inner surface 322 of flange bore 312, including first chamfer 314, may be lubricated during an assembly of axle assembly 300. In one example, inner surface 322 may be lubricated prior to placing an O-ring at a beveled lip 324.

FIG. 3B shows a perspective view 360 of exemplary axle assembly 300 of FIG. 3A, where inner surface 322 is being lubricated by a bore lubricator 362, which may be a non-limiting example of bore lubricator 102 of FIG. 1 and/or bore lubricator 202 of FIGS. 2A and 2B. Bore lubricator 362 includes a lubricant applicator 370 located within a groove along an outer circumference of a plunger portion 364 of bore lubricator 362, as described above in reference to FIGS. 2A and 2B. Plunger portion 364 has a diameter (e.g., an outer diameter) equal to diameter 358. For the purposes of this disclosure, equal to diameter 358 may be understood as being smaller than diameter 358 by a small threshold amount, such that plunger portion 364 may be inserted into flange bore 312 with a minimum amount of space (e.g., 0.5-2 mm) between an outer circumference of plunger portion 364 and inner surface 322 of flange bore 312. In various embodiments, bore lubricator 362 may be selected from a plurality of bore lubricators of different sizes, based on diameter 358 of flange bore 312. A piston portion 366 of bore lubricator 362 is shown extending out from plunger portion 364, as described above in reference to FIGS. 1-2B.

To lubricate inner surface 322, bore lubricator 362 is positioned such that plunger portion 364 is adjacent to flange bore 312, where lubricant applicator 370 is in contact with first chamfer 314. As a result of the diameter of plunger portion 364 being equal to (or slightly less than) diameter 358, the contact between lubricant applicator 370 and inner surface 322 may be equal (e.g., within a threshold) across the inner circumference of first chamfer 314. Lubricant applicator 370 is inserted through first chamfer 314 into flange bore 312. As lubricant applicator 370 is inserted into first chamfer 314 and flange bore 312, a portion of lubricant applicator 370 that extends outward from the outer circumference of plunger portion 364 (e.g., extending portion 226 of FIG. 2A) may be compressed against first chamfer 314 and inner surface 322 to allow plunger portion 364 to enter flange bore 312. As plunger portion 364 enters first chamfer 314, a user of bore lubricator 362 may actuate a lubricant delivery system of bore lubricator 362 to direct the lubricant through a plurality of holes (e.g., the plurality of holes 290 of FIG. 2B) into a soft, porous material of lubricant applicator 370, where the lubricant is applied to first chamfer 314 and inner surface 322. The compression of lubricant applicator 370 against first chamfer 314 and inner surface 322 may ensure that the lubricant is applied in an even and uniform manner.

It should be further appreciated that lubricant applicator 370 extends outward from plunger portion 364 by a compressible margin (e.g., 1.5-2 mm) large enough to apply the lubricant to both inner surface 322 and the slightly larger inner diameter of first chamfer 314. In other words, lubricant applicator 370 may compress a first amount as lubricant applicator 370 is inserted into first chamfer 314, and then may compress a second, larger amount as lubricant applicator 370 is inserted into flange bore 312. In this way, sufficient pressure is generated against a surface of first chamfer 314 and inner surface 322 to apply lubricant to both the surface of first chamfer 314 and inner surface 322 in a uniform and consistent manner.

Figure 4:
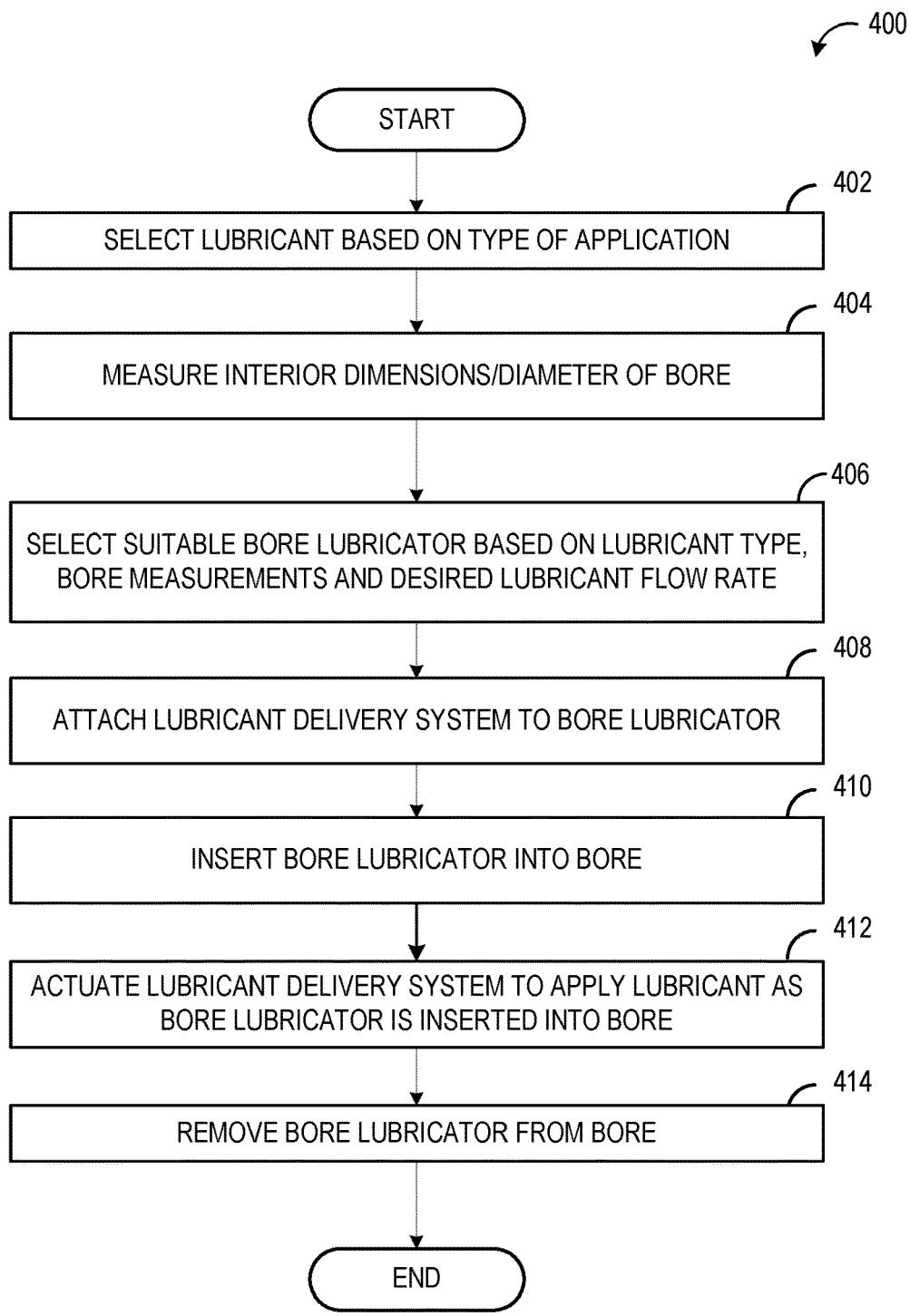
FIG. 4 is a flowchart illustrating an exemplary method for lubricating a bore with the bore lubricator.
Figure 5:
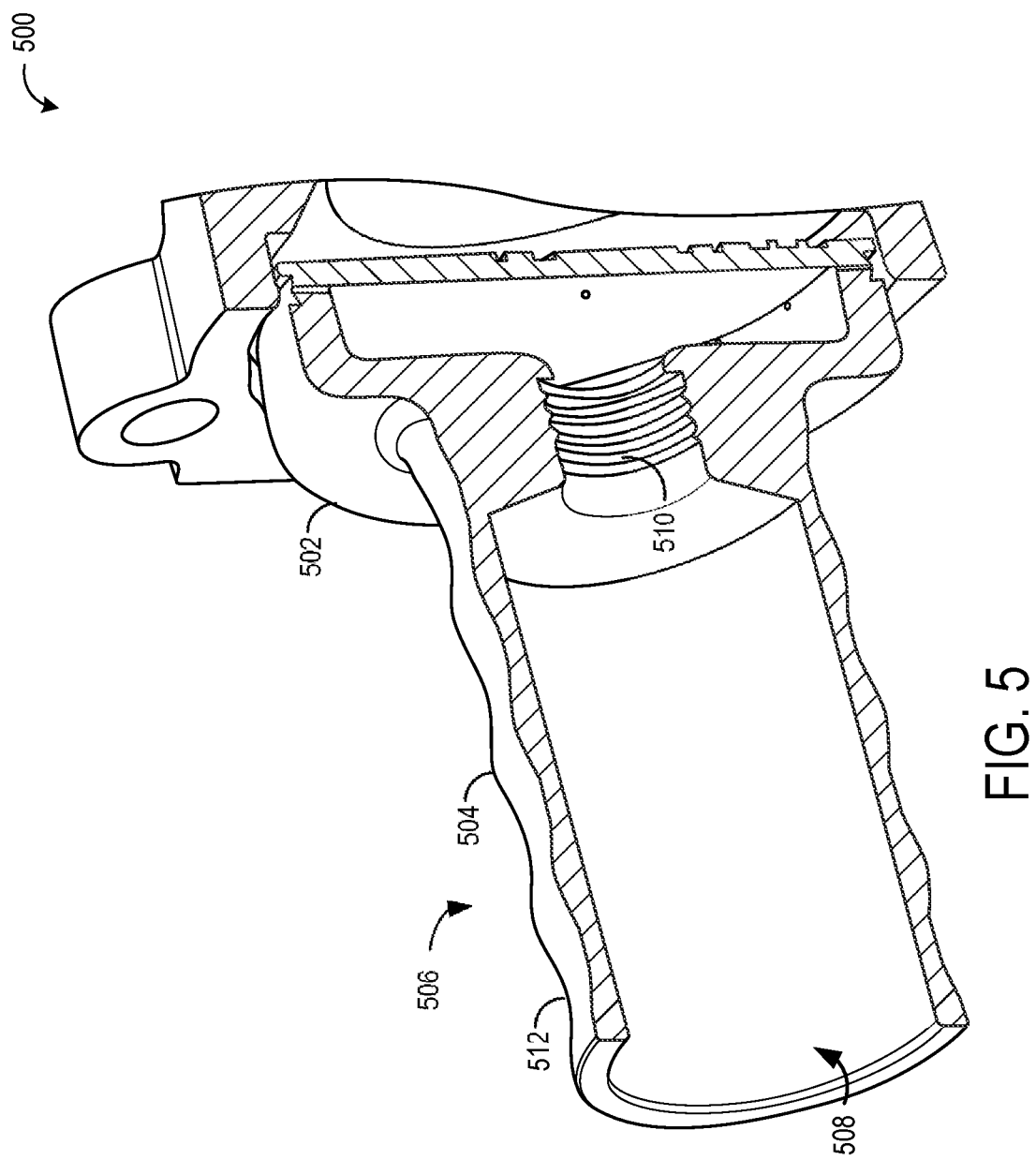
FIG. 5 is a perspective view of a piston portion of a bore lubricator with a handle.

Turning now to FIG. 4, an exemplary method 400 is shown for lubricating a bore using a bore lubricator, such as bore lubricators 102, 202, and/or 362 of FIGS. 1, 2A and 2B, and 3B, respectively. The bore may be a flange bore, such as flange bore 112 of FIG. 1 and/or flange bore 312 of FIG. 3A, respectively.

Method 400 begins at 402, where method 400 includes selecting a lubricant. In various embodiments, the lubricant may be selected based on a type of application of the lubricant. The type of application of the lubricant may depend on a type or characteristics of the bore to be lubricated. In other words, a first type of lubricant may be used on a first type of bore, and a second type of lubricant may be used on a second type of bore. For example, a 75w85 Full Synthetic lubricant may be applied to an axle at an axle assembly plant, and a different lubricant may be applied for a different component.

At 404, method 400 includes measuring interior dimensions of the bore. For example, the bore may be a cylindrical bore, and measuring the interior dimensions of the bore may include measuring a diameter of the bore. Alternatively, the bore may have an oval profile, or a square or rectangular profile, where measuring the interior dimensions of the bore may include measuring a height and/or width of the oval, square, or rectangular bore. In other embodiments, the bore may have a different shape.

At 406, method 400 includes selecting a suitable bore lubricator based on the type of lubricant, the interior dimensions of the bore, and a desired lubricant flow rate. For example, if the bore is a cylindrical bore, a bore lubricator may be selected that includes a plunger portion (e.g., plunger portion 107) that is round and has a diameter equal to the diameter of the cylindrical bore (e.g., a diameter smaller than the diameter of the cylindrical bore by a small threshold amount). In other words, a first bore lubricator of a first size and shape may be used to lubricate a first bore; a second bore lubricator of a second size and shape may be used to lubricate a second bore, the second size and shape different from the first size and shape; a third bore lubricator of a third size and shape may be used to lubricate a third bore, the third size and shape different from the second and first size and shape; and so on.

An amount of lubricant to be applied to an inner surface of the bore may vary, depending on the type of bore, type of lubricant, type of application, or other factors. The lubricant may be applied by a lubricant applicator such as a felt O-ring (e.g., lubricant applicator 106/206/326 of FIGS. 1, 2A, and 3B, respectively) located in a groove of the plunger portion (e.g., groove 204). The groove may include a plurality of holes (e.g., the plurality of holes 290) through which the lubricant is ejected into the lubricant applicator by a pressure generated by a lubricant delivery system of the bore lubricator. In some embodiments, the lubricant may be delivered by a force of gravity. Thus, the amount of lubricant applied to the inner surface may be partially controlled by the pressure generated by a lubricant delivery system as the lubricant delivery system is actuated by a user of the bore lubricator. For example, the user may squeeze a lubricant bottle at a first pressure, whereby a first amount of lubricant may be ejected into the lubricant applicator and applied to the inner surface. The user may squeeze the lubricant bottle at a second pressure greater than the first pressure, whereby a second amount of lubricant may be ejected into the lubricant applicator and applied to the inner surface, the second amount greater than the first amount. By varying the amount of pressure, the user may apply a greater or lesser amount of lubricant to the inner surface (the amount of lubricant applied is more controlled by the fit of the felt applicator to the bore of the flange, it is variable but only if multiple applications (or plunges) are made.

Additionally, the amount of lubricant applied to the inner surface may be partially controlled by a sizing of the plurality of holes. For example, a first bore lubricator with larger holes may be selected if an amount of lubricant to be applied to the inner surface is greater, and a second bore lubricator with smaller holes may be selected if the amount of lubricant to be applied to the inner surface is smaller. Thus, the bore lubricator may be selected based on a desired flow rate through the plurality of holes, based on a constant pressure applied by the lubricant delivery system.

At 408, method 400 includes attaching the lubricant delivery system to the bore lubricator. The lubricant delivery system may be coupled to a proximal end (e.g., proximal end 109 of FIG. 1) of the bore lubricator. In one embodiment, the lubricant delivery system is a plastic, squeezable lubricant bottle including a threaded opening, which may be coupled to the bore lubricator by screwing the squeezable lubricant bottle into a threaded aperture at the proximal end of the bore lubricator (e.g., threaded inner surface 122 of aperture 104). Thus, the lubricant delivery system may be actuated by the user squeezing the lubricant bottle to generate the pressure to deliver the lubricant to the lubricant applicator.

At 410, method 400 includes inserting the bore lubricator into the bore. At 412, method 400 includes actuating the lubricant delivery system to apply the lubricant to the inner surface of the bore as the bore lubricator is inserted into the bore. When the lubricant delivery system is actuated, a pressure may be generated in the lubricant that causes the lubricant to flow through the bore lubricator to the lubricant applicator. In one embodiment, the pressure is generated by the user squeezing a lubricant bottle or a squeezable portion of the bore lubricator. In another embodiment, the pressure may be generated in an alternative manner. For example, the lubricant delivery system may include a gravity fed dispenser, or a pressurized lubrication dispenser, where the pressure is generated by a separate component (e.g., a pump), or a different type of dispenser.

As the bore lubricator is inserted into the bore, a constant pressure may be applied by the user and/or lubricant delivery system. The constant pressure may deliver the lubricant to the plurality of holes in a manner that is consistent and even. For example, lubricant conduits included in the bore lubricator may be sized and positioned such that the lubricant is expelled out of the plurality of holes equally across the plurality of holes. In other words, a length and a diameter of lubricant conduits leading to the plurality of holes may be equal, such that an equal amount of lubricant is delivered at each hole of the plurality of holes. Further, the size, number and spacing of the holes may be selected to apply a desired amount of lubricant (e.g., for a given application) with a single insertion of the bore lubricator without rotating the bore lubricator, such that multiple insertions or rotations of the plunger portion are not relied on to sufficiently lubricate the bore.

At 414, method 400 includes extracting the bore lubricator from the bore. The bore lubricator may be extracted from the bore by sliding the bore lubricator out of the bore in a direction opposite to the direction in which the bore lubricator was inserted into the bore. As the bore lubricator is extracted from the bore, the lubricant applicator may smooth the lubricant applied to the inner surface of the bore, ensuring that the lubricant is applied as a thin, uniform coating, with no drips, portions with excess lubricant, or unlubricated portions. Method 400 ends.

Thus, a novel bore lubricator is proposed that efficiently and quickly applies lubricant to a bore, with a design that may be customized to a type of lubrication, type of bore, and/or type of application. The bore lubricator includes a plunger portion that may be sized and shaped to fit snugly within a corresponding bore. The bore lubricator may include a lubricant applicator arranged around an outer perimeter of the plunger portion. The lubricant applicator may be inserted into a groove on the outer perimeter, the groove including a plurality of holes through which pressurized lubricant may be expelled into the lubricant applicator. The lubricant applicator may be made of a soft, porous material that may efficiently soak up the lubricant.

For example, the lubricant applicator may be a O-ring made of felt or a similar organic or synthetic material. In one embodiment, the lubricant applicator may be made of plastic or nylon, such as, for example, a loop portion of Velcro® material. The lubricant applicator may extend out from the outer perimeter of the plunger portion, such that the lubricant applicator may be pressed evenly against sides of an inner surface of the bore when the plunger portion is inserted into the bore. As a result of the lubricant applicator being pressed against the inner surface, lubricant soaked up by the lubricant applicator may be applied to the inner surface. Additionally, an amount of lubricant applied to the inner surface may be controlled by a pressure applied by a lubricant delivery system. For example, the lubricant delivery system may include a lubricant bottle, and the pressure may be generated by a user of the bore lubricator by squeezing the bottle. The amount of lubricant may also be controlled by adjusting a size, number, and spacing of the plurality of holes, and/or a size of the lubricant applicator.

In this way, the bore may be lubricated in a rapid and efficient manner, which may reduce a time taken to assemble a system including the bore, such as an axle assembly of a vehicle. Additionally, using the bore applicator, the lubricant may be applied in a coating that may be more evenly distributed around the inner surface than a coating applied via other methods, without applying lubricant excessively to some portions and insufficiently to other portions.

For example, to lubricate a bore without using the bore lubricator described herein, a person may apply lubricant manually via a brush or pad. The person may not apply equal pressure on the brush or pad at all portions of the inner surface of the bore. For example, the person may apply more pressure when applying the lubricant to a lower portion of a bore than an upper portion, which may be less visible to the person and/or harder to reach. As a result of the unequal pressure, an excess of lubricant may be applied to some portions, and/or other portions may have a deficit of lubricant. Additionally, lubricant may drip from the brush or pad onto the inner surface, and drips or excess lubricant may pool in lower portions of the inner surface due to a force of gravity. As a result of the uneven application of lubricant, an amount of degradation and/or wear occurring in the bore and/or components inserted into the bore may be increased. For example, an O-ring may be inserted into the bore after lubrication, where if the lubricant is applied manually, the O-ring may be more easily damaged, or the O-ring may not be positioned accurately within the bore. False-positives for leaks may also occur during testing of components including the bore. Alternatively, a component snugly inserted into the bore (e.g., an axle of an axle assembly) may experience degradations at portions of the inner surface with insufficient lubrication. By applying the lubricant via the bore lubricator, an overall efficiency of an assembly process may be increased, reducing a time and cost of the assembly, and a useful life of components of systems including the bore may be increased. Further, by using the bore lubricator, a contact of the lubricant with a human applying the lubricant may be minimized.

The technical effect of applying a lubricant to a bore using the bore lubricator described herein is that the bore may be more efficiently and evenly lubricated, reducing an amount of degradation in components in contact with lubricated portions of the bore, and increasing a speed of assembly of components including the bore.

The disclosure also provides support for a lubrication system, comprising: a piston-shaped bore lubricator with a plunger portion including a soft, porous material arranged in an external groove at a distal end of the plunger portion, the external groove including holes through which a lubricant is ejected into the soft, porous material as the plunger portion is positioned in a bore. In a first example of the system, a proximal end of the bore lubricator includes threads for coupling a lubricant delivery system to the bore lubricator. In a second example of the system, optionally including the first example, the lubricant delivery system includes a squeezable bottle, and the lubricant is ejected through the soft, porous material via an actuation of the squeezable bottle. In a third example of the system, optionally including one or both of the first and second examples, the lubricant delivery system includes a hollow cavity in a piston portion of the bore lubricator, into which a lubricant bottle is inserted, and the lubricant is ejected through the soft, porous material via a force of gravity. In a fourth example of the system, optionally including one or more or each of the first through third examples, outer dimensions of the plunger portion are adjusted to fit inner dimensions of the bore. In a fifth example of the system, optionally including one or more or each of the first through fourth examples, a size of the holes may be adjusted to increase or decrease a flow rate of the lubricant through the soft, porous material. In a sixth example of the system, optionally including one or more or each of the first through fifth examples porous material is manufactured from one of a felt material, a plastic material, and a nylon material. In a seventh example of the system, optionally including one or more or each of the first through sixth examples porous material is specific to a type of application of the lubrication system. In a eighth example of the system, optionally including one or more or each of the first through seventh examples, at least one of a number, a sizing, and a spacing of the holes is specific to a type of application of the lubrication system. In a ninth example of the system, optionally including one or more or each of the first through eighth examples, the plunger portion is round, and the bore is cylindrical. In a tenth example of the system, optionally including one or more or each of the first through ninth examples, the bore is a tube flange of an axle assembly of a vehicle. In a eleventh example of the system, optionally including one or more or each of the first through tenth examples, the plunger portion is a shape other than round, and the bore has a profile that is not cylindrical.

The disclosure also provides support for a method for lubricating a bore, comprising: selecting a type of lubricant, based on an application of the lubricant, measuring one or more interior dimensions of the bore, selecting a bore lubricator based on the lubricant type, the one or more interior dimensions, and a desired flow rate of the lubricant, coupling a lubricant delivery system to the bore lubricator, inserting the bore lubricator into the bore, and actuating the lubricant delivery system to apply the lubricant to the bore, the bore lubricator including a plunger portion with a soft, porous material arranged in an external groove at a distal end of the plunger portion, the external groove including holes through which the lubricant is ejected into the soft, porous material. In a first example of the method, coupling the lubricant delivery system to the bore lubricator further comprises screwing a lubricant bottle into threads included on a proximal end of the bore lubricator, and selecting the bore lubricator based on the lubricant type further comprises selecting a bore lubricator with threads that couple with threads of the lubricant bottle. In a second example of the method, optionally including the first example, the soft, porous material is felt, plastic, or nylon. In a third example of the method, optionally including one or both of the first and second examples, the lubricant delivery system is a squeezable bottle inserted into a hollow piston portion of the bore lubricator, and actuating the lubricant delivery system to apply the lubricant to the bore further comprises squeezing the squeezable bottle. In a fourth example of the method, optionally including one or more or each of the first through third examples, selecting the bore lubricator based on the lubricant type further comprises: in a first condition, where a higher flow rate is desired, selecting a bore lubricator with an external groove including at least one of a greater number of holes, holes of a greater diameter, and holes more closely spaced together, and in a second condition, where a lower flow rate is desired, selecting a bore lubricator with an external groove including at least one of a lesser number of holes, holes of a lesser diameter, and holes less closely spaced together.

The disclosure also provides support for a device for lubricating a cylindrical bore, the device comprising: a cylindrical plunger portion including a felt O-ring positioned in an external groove around an outer circumference of the plunger portion, the groove including holes through which a lubricant is delivered, through the felt O-ring, to an inner surface of the cylindrical bore as the plunger portion is inserted into the cylindrical bore, the lubricant applied by the felt O-ring. In a first example of the system, the lubricant is delivered through the holes by squeezing a lubricant bottle coupled to the device via threads included around an inner circumference of a hole in an end of the cylindrical plunger portion. In a second example of the system, optionally including the first example, the outer circumference of the plunger portion is adjusted to fit an inner circumference of the cylindrical bore, and a size of the holes is adjusted to increase or decrease a flow rate of the lubricant through the felt O-ring.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive.

It will be appreciated that the configurations and routines disclosed herein are exemplary in nature, and that these specific embodiments are not to be considered in a limiting sense, because numerous variations are possible. As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

FIGS. 1-3B show example configurations with relative positioning of various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A lubrication system, comprising:
a piston-shaped bore lubricator with a plunger portion including a lubricant applicator comprising a porous material, the lubricant applicator arranged in an external groove at a distal end of the plunger portion, the external groove including holes through which a lubricant is ejected into the porous material as the plunger portion is positioned in a bore;
wherein the porous material is comprised of one of a felt material, a plastic material, and a nylon material.

2. The lubrication system of claim 1, wherein a proximal end of the bore lubricator includes threads for coupling a lubricant delivery system to the bore lubricator.

3. The lubrication system of claim 2, wherein the lubricant delivery system includes a squeezable bottle, and the lubricant is ejected through the porous material via an actuation of the squeezable bottle.

4. The lubrication system of claim 2, wherein the lubricant delivery system includes a hollow cavity in a piston portion of the bore lubricator, into which a lubricant bottle is inserted, and the lubricant is ejected through the porous material.

5. The lubrication system of claim 4, wherein the lubricant is directed to the plunger portion through a central conduit located inside the piston portion, and the lubricant is directed to the holes via a plurality of lubricant conduits leading from the central conduit to the holes.

6. The lubrication system of claim 1, wherein the plunger portion is round, and the bore is cylindrical.

7. The lubrication system of claim 6, wherein the bore is a tube flange of an axle assembly of a vehicle.

8. The lubrication system of claim 1, wherein the lubricant applicator comprises an O-ring with a circular profile, where a width of the O-ring is the same as a depth of the O-ring, the width corresponding to a dimension of the O-ring that is parallel to an outer surface of the plunger portion, and the depth corresponding to a dimension of the O-ring that is perpendicular to the outer surface.

9. The lubrication system of claim 8, wherein a depth of the external groove is less than the depth of the O-ring, such that when the O-ring is positioned within the external groove, the lubricant applicator extends out from an outer wall of the plunger portion.

10. The lubrication system of claim 9, wherein, when the plunger portion is inserted into the bore, an extending portion of the lubricant applicator is compressed against an inner surface of the bore, such that an outer surface of the lubricant applicator is in snug contact with the inner surface along an inner circumference of the bore.

11. The lubrication system of claim 10, wherein the lubricant is applied via the lubricant applicator as the extending portion is compressed against the inner surface.

12. The lubrication system of claim 10, wherein the lubricant applicator extends out from the outer wall of the plunger portion by a compressible margin large enough to apply the lubricant to both of the inner surface and a surface of a chamfer of the bore adjacent to the inner surface, the chamfer having a larger diameter than the bore.

13. A device for lubricating a cylindrical bore, the device comprising:
  a cylindrical plunger portion including a felt O-ring positioned in an external groove around an outer circumference of the plunger portion, the groove including holes through which a lubricant is delivered, through the felt O-ring, to an inner surface of the cylindrical bore as the plunger portion is inserted into the cylindrical bore, the lubricant applied by the felt O-ring.

14. The device of claim 13, wherein the lubricant is delivered through the holes by squeezing a lubricant bottle coupled to the device via threads included around an inner circumference of a hole in an end of the cylindrical plunger portion.

15. The device of claim 13, wherein a first diameter of the plunger portion is smaller than a second diameter of the cylindrical bore by a threshold amount, such that the plunger portion may be inserted into the cylindrical bore with a minimum amount of space between an outer surface of the plunger portion and the inner surface of the cylindrical bore, the threshold amount between 0.5 mm and 2 mm.

16. A lubrication system, comprising:
  a plurality of bore lubricators, each bore lubricator of the plurality of bore lubricators having a plunger portion including a felt, nylon, or plastic O-ring lubricant applicator arranged in an external groove at a distal end of the plunger portion, the external groove including a plurality of holes through which a lubricant is ejected through the lubricant applicator as the plunger portion is positioned in a bore;
  wherein the plunger portion of each bore lubricator of the plurality of bore lubricators has a different diameter, each bore lubricator sized to fit a bore of a corresponding diameter.

17. The lubrication system of claim 16, wherein a portion of the O-ring lubricant applicator of each bore lubricator extends outward from an outer surface of the plunger portion, and the lubricant is applied to an inner surface of the bore of the corresponding diameter as the O-ring lubricant applicator is compressed against an inner surface of the bore.

18. The lubrication system of claim 17, wherein the lubricant is ejected through the plurality of holes via an actuation of a squeezable bottle containing the lubricant included in a hollow cavity in a piston portion of a bore lubricator of the plurality of bore lubricators.

19. The lubrication system of claim 18, wherein a proximal end of the bore lubricator includes threads for coupling the squeezable bottle to the bore lubricator.

* * * * *